June 2, 1959 — W. C. WOOTTON — 2,888,971
RESILIENTLY RETAINED SEPARABLE FASTENER
Filed May 23, 1957
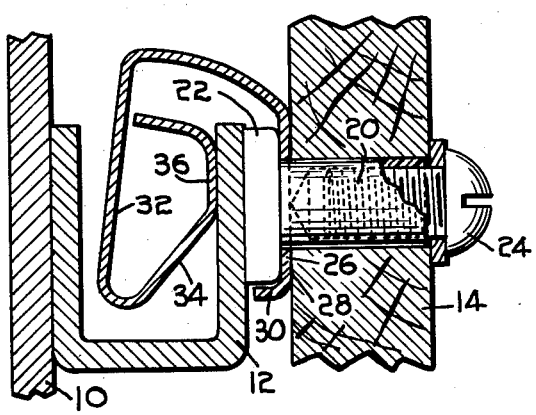
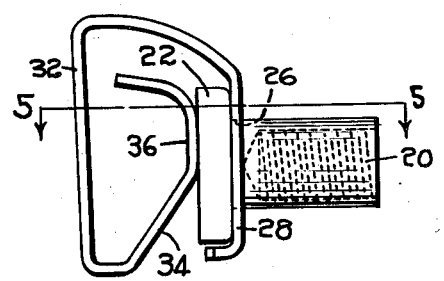
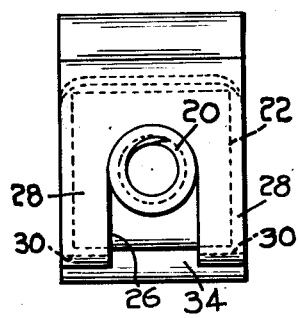
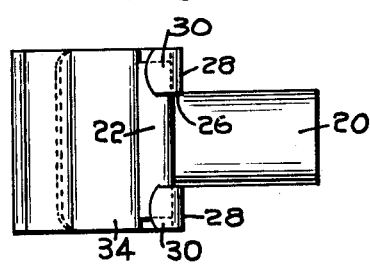
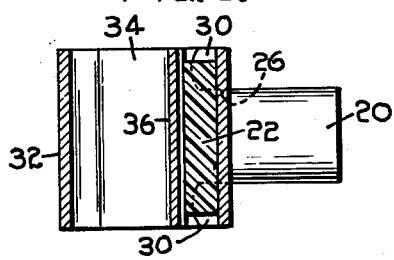
INVENTOR:
WILLIAM C. WOOTTON
BY Emery Booth Townsend
Miller Whisner ATTORNEYS

United States Patent Office 2,888,971
Patented June 2, 1959

2,888,971
RESILIENTLY RETAINED SEPARABLE FASTENER

William C. Wootton, Centerville, Calif., assignor to United-Carr Fastener Corporation, Boston, Mass., a corporation of Delaware Application May 23, 1957, Serial No. 661,130

2 Claims. (Cl. 151—41.75)

This invention relates to a fastener element comprising a member having a shank or stud which provides means for conjunction with a part to be held and a mounting for securing such member with its shank projecting from a plate or panel which panel presents an edge portion with which the mounting may be engaged from the exposed face of the plate. The invention provides a simple and convenient device for this use and one wherein unitary means serves both to hold the member and its mounting in assembled condition for handling as a unit when applying the same and also to retain the fastener element in position on the plate.

An example of the application of the fastener is to secure a so-called lining to interior surfaces of an airplane body, and there is herein shown in a general way such as application for illustrative purposes and without limiting intention.

The invention will be well understood from the following description of the illustrative embodiment thereof, shown by way of example in the accompanying drawings wherein:

Fig. 1 is a conventionalized section through the frame of an airplane and a liner therefor showing one of the elements in position;

Fig. 2 is a side elevation of the element alone;

Fig. 3 is an end elevation thereof as seen from the right of Fig. 2;

Fig. 4 is a bottom plan view viewing Fig. 2; and

Fig. 5 is a section on line 5—5 of Fig. 2.

Referring now to Fig. 1 of the drawings, there is shown at 10 the shell of an airplane body and one of the structural reinforcements thereof, consisting of a channel having an open top so the right-hand flange 12 viewing the figure has an exposed edge to which the element to be described may be attached, the inner face of the channel being accessible from the right-hand side over this edge. This flange 12 is a specific example of a plate having at least a portion of its edge exposed in such a manner as to permit the passage of a portion of the retaining member to be described past said edge to engage the opposite surface of the plate. A lining 14 for the internal surface of this structure is attached by means of the fasteners to be described.

The fastener comprises a member having a shank 20 having a laterally enlarged head 22 which is herein square and the shank in the present instance is in the nature of a sleeve nut to cooperate with a screw 24 securing the liner 14. The shank and head 22 may be molded from non-metallic material, such as a suitable grade of nylon as may be the screw. The threaded connection is merely one example of joining means which might be utilized.

To secure the shank in position projecting inwardly from the frame of the plane a retaining member is provided in the form of a strip of resilient metal which engages the enlarged head 22 to hold the same relatively to the pull exerted on the fastening tending to separate the parts joined thereby. Herein as best seen in Fig. 3 one end of the strip is formed with an opening 26 (Fig. 3) in the form of an open ended slot into which the shank 20 may be entered to dispose the enlarged head 24 at the rear side of the same behind the rearwardly facing margins of the slot. In the present instance end portions of the two tongues 28 defined by the slot are bent over to form ears 30 on which the margin of the head 24 may rest when it is pressed against the inner surfaces of the arms and which prevent the shank from moving out of the open end of the slot. From its slotted end portion the strip is extended rearwardly and coiled into a springy loop which herein includes a downwardly extending part 32 spaced from the slotted end, an upwardly and forwardly inclined part 34 and a part 36 near the end of the loop, conveniently flattened as shown, opposing the rear face of the head 24. The loop may be somewhat expanded from the position shown in Fig. 2 to permit the stud member to be assembled in the position shown and, on being released, will resume the position of Fig. 2, pressing against the rear face of the head 24 and holding the headed stud in position.

The element comprising the headed shank and its retaining member is assembled as a unit, as shown in Fig. 2, and when the lining 14 is to be applied it may be secured by entering the edge of the exposed flange 12 into the space between the inclined part 34 and the back of the head and pressing the element downwardly so that this flange will expand the loop and enter between the bearing surface 36 of the same and the rear surface of the head as shown in Fig. 1. The shank 20 provides a convenient handle for installing the fastener. The lining is then secured by suitable means cooperating with the stud as in the present instance the screw 24.

It will be noted that the spring loop performs a double function in retaining the headed stud assembled with the retaining member before the application of the fastener to use, the parts being then in the position of Fig. 2, and also in holding and clamping the head of the stud against the outer surface of the structure on which it is mounted by admitting the edge of the part 12 between the back surface of the stud and itself.

I am aware that the invention may be embodied in other specific forms without departing from the spirit or essential attributes thereof, and I therefore desire the present embodiment to be considered in all respects as illustrative and not restrictive, as is in fact clear in several matters from the description itself. Reference is to be had to the appended claim to indicate those principles of the invention exemplified by the particular embodiment described and which I desire to secure by Letters Patent.

I claim:

1. A fastener element comprising a member having a laterally enlarged head and a shank projecting therefrom, the shank providing means for conjunction with a part to be held and a retaining member in the form of a strip of resilient metal having at one end an opening through which the shank is passed to dispose the head behind the rearwardly facing margins of the opening, the strip being folded over rearwardly and then downwardly in spaced opposition to said end having the opening and then rebent upwardly and forwardly to a point substantially opposite said opening and then having a portion substantially parallel to said first end and yieldably bearing on the laterally enlarged head, said rebent portion providing a wide but inwardly tapering entrance into which the edge of a plate on which the element is to be supported may be entered to force back said substantially parallel portion and come to rest between the same and said head to be resiliently gripped by the coiled loop formed by the folded over and rebent portions of the strip.

2. A fastener element as in claim 1 wherein said opening is an open-ended slot defining lateral arms, terminal portions of the arms being turned back to form ears which underlie the head and support the same.

References Cited in the file of this patent

UNITED STATES PATENTS

| | | |
|---|---|---|
| 1,909,941 | Finch | May 23, 1933 |
| 1,930,187 | Abronski | Oct. 10, 1933 |
| 2,108,611 | Richardson | Feb. 15, 1938 |
| 2,150,476 | Woodall | Mar. 14, 1939 |
| 2,274,014 | Tinnerman | Feb. 24, 1942 |
| 2,590,450 | Parsons | Mar. 25, 1952 |